C. J. BEAVER, A. F. W. RICHARDS AND E. A. CLAREMONT.
DETECTIVE AND PROTECTIVE DEVICE FOR ELECTRIC CABLES.
APPLICATION FILED SEPT. 25, 1918.
1,308,388.  Patented July 1, 1919.
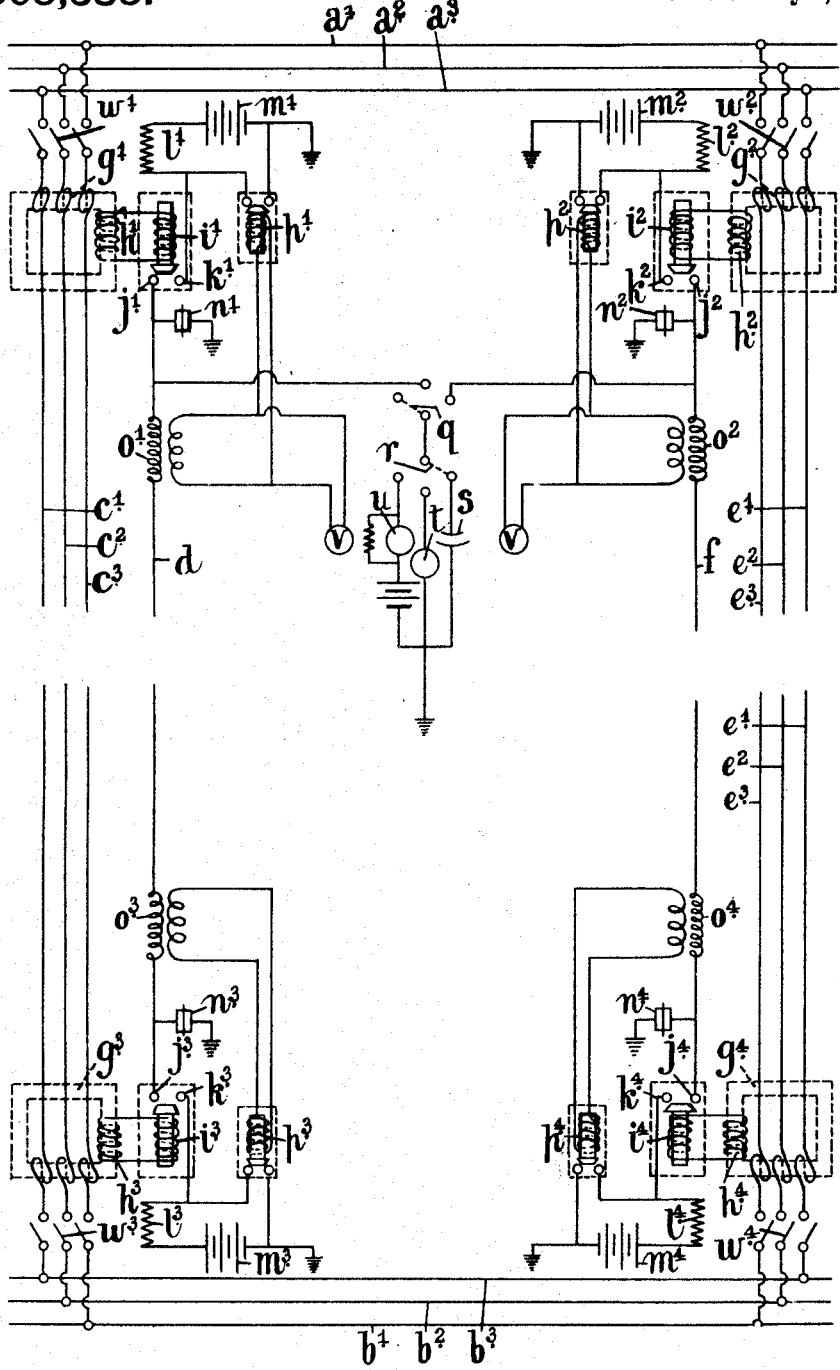
Inventors:
C. J. Beaver.
A. F. W. Richards.
E. A. Claremont.
by their Attorney:

UNITED STATES PATENT OFFICE.

CHARLES JAMES BEAVER, OF HALE, ARTHUR FRANCIS WARD RICHARDS, OF BROOKLANDS, AND ERNEST ALEXANDER CLAREMONT, OF HIGH LEGH, ENGLAND.

DETECTIVE AND PROTECTIVE DEVICE FOR ELECTRIC CABLES.

1,308,388.  Specification of Letters Patent.  Patented July 1, 1919.

Application filed September 25, 1918. Serial No. 255,623.

*To all whom it may concern:*

Be it known that we, CHARLES JAMES BEAVER, of Hale, Chesire, England, electrical engineer, ARTHUR FRANCIS WARD RICHARDS, of Brooklands, Cheshire, England, engineer, and ERNEST ALEXANDER CLAREMONT, of High Legh, Cheshire, England, electrical engineer, subjects of the King of Great Britain and Ireland, have invented certain new and useful Improvements in Detective and Protective Devices for Electric Cables, of which the following is a specification.

The object of this invention is to provide a more efficient and safer control of electric cables including both the detecting of defects at an early stage and provision for automatic cutting out in case of serious leakage. The invention is applicable only to alternating current installations.

According to our invention the cable contains an auxiliary conductor surrounding the main insulated conductor or conductors preferably in the form of one or more flat metal tapes wound spirally over the main insulated conductor or conductors and arranged concentrically with the outer covering, which auxiliary conductor we call the "test" conductor. This test conductor is normally insulated throughout, but means are provided whereby on any relative disturbance of the currents in the main conductors the test conductor is automatically connected to earth through a battery or other source of electric energy, and the main circuit breaker trip coils in series so that on a fault in the insulation between the test conductor and the outside covering allowing a leakage to earth a circuit will be established which will operate the main circuit breaker trip coils.

Means are also provided whereby the test conductor can be connected to earth alternatively through various instruments, to determine whether and to what extent the insulation between it and the main conductor or conductors, or between it and the outside covering has become defective.

The accompanying drawing illustrates diagrammatically an example of the invention.

Referring to the drawing, $a'$, $a^2$, $a^3$ represent the bus bars at the generating station, and $b'$, $b^2$, $b^3$ bus bars at a sub-station. These bars are represented as connected by two main cables of a 3-phase feeder, each of said cables being represented as comprising three main conductors, respectively designated $c'$, $c^2$, $c^3$ and $e'$, $e^2$, $e^3$, and each of said cables further includes a test conductor, respectively designated $d$, $f$.

Between the conductors of each cable and the respective bus bars are arranged main circuit breakers, $w'$, $w^2$, $w^3$, $w^4$, each adapted to be operated by a trip coil, which coils are severally designated $l'$, $l^2$, $l^3$, $l^4$.

The test conductor of each cable is arranged concentric with the outer covering surrounding the main conductor or conductors, preferably insulated from the outer covering by hygroscopic material in the manner described in British Patent No. 22355 of 1912.

At each end of the several sections of cable to be controlled and protected there is arranged a contact or terminal ($k'$, $k^2$, $k^3$, $k^4$) which is adapted to be connected in series with the test conductor, a battery ($m'$, $m^2$, $m^3$, $m^4$), the trip coil of the adjacent main circuit breaker, and a reactance coil ($o'$, $o^2$, $o^3$, $o^4$) connected to earth through a plate gap ($n'$, $n^2$, $n^3$, $n^4$). Further, adjacent each end of the several sections of the cable to be controlled there is installed a balancing transformer ($g'$, $g^2$, $g^3$, $g^4$) to which the main conductors of the cable are connected, the secondary coil of each transformer being connected to a solenoid ($i'$, $i^2$, $i^3$, $i^4$) which when energized operates a switch adapted to connect the said terminal ($k'$, $k^2$, $k^3$, $k^4$) with a terminal ($j'$, $j^2$, $j^3$, $j^4$) connected to the test conductor.

Each of the reactance coils has a secondary winding by means of which signaling devices ($v$) are operated when leakage currents pass through the said reactances. The said secondary windings are also connected to solenoid switches ($p'$, $p^2$, $p^3$, $p^4$) which complete a subsidiary circuit with the battery and main circuit breaker trip coils in circuit and operate the trip coils when the corresponding plate gaps ($n'$, $n^2$, $n^3$, $n^4$) or the solenoids ($i'$, $i^2$, $i^3$, $i^4$) have earthed the test sheath conductor and a predetermined value of leakage current is attained therein.

The main circuit breaker trip coils ($l'$, $l^2$, $l^3$, $l^4$) are of the permanent magnet moving coil construction, operable only by direct current, so as to insure that they shall not act by the alternating leakage current only.

The devices are so adjusted that the main circuit breaker trip coils do not operate except on a predetermined strength of direct current passing through the same superimposed on the leakage current as hereinafter explained.

In the event of any defect of the insulation of the main conductor or one of the main conductors allowing a leakage of current and causing the balance in the transformers to be disturbed, the solenoids will be energized and will, by closing the switches which they control, cause the test conductor to be connected at both ends in series with the batteries, the main circuit breaker trip coils and the reactance coils to earth. The batteries are opposing one another so that no current flows from either merely by the connecting up to the test conductor as above. In the case of a number of parallel feeders, we may employ a common battery at each end of the line.

We also connect to the test conductor at a convenient place in the section to be controlled and protected, a four way switch $r$, of which the first position is off the second makes connection with an electrostatic voltmeter $s$ or like device connected to earth the third makes connection to earth through a voltmeter or an ammeter $t$ and the fourth makes connection to earth in series with a battery and a shunted galvanometer $u$ to test for faults in the insulation between the test conductor and the outside covering.

Obviously some means other than a four way switch might be employed to make the various connections.

It is not essential that both the second and third connections should be used: if preferred the latter can be used alone if (in the case of a polyphase system) the neutral point or (in the case of a single phase system) the mid-voltage point or one terminal of the generator is earthed and the former where it is unearthed. $q$ is a switch by means of which the test sheath of any feeder may be connected to the four way switch $r$.

With apparatus installed and connected as above, the following results are attained:

Firstly, in the event of any injury to the cable from external damage, in the first place the resistance of the test conductor insulation will be reduced and this will be indicated on the four way switch being connected to fourth position. In the second place, if the damage is more extensive or the fault develops so as to cause a leakage from the main conductor or one of the main conductors to the test conductor, early indication will be given on the four way switch being moved to position No. 2, and the extent of leakage on it being moved to position No. 3. In the third place, on the fault further developing, and leakage to a predetermined value taking place, the balancing transformers are unbalanced, and the test conductor connected at both ends in series with the batteries main circuit breaker trip coils and reactance coils to earth, and accordingly a circuit is established from each battery via one of the main circuit breaker trip coils, one of the reactance coils, earth, the original fault through the test conductor insulation and the test conductor, and the currents in these circuits flowing through the main circuit breaker trip coils (superimposed on the leakage current flowing from the main conductor via the test conductor and the batteries through the main circuit breaker trip coils and via the reactance coils and earth) will operate the main circuit breakers.

Secondly, in the event of the insulation of the main conductor or one of the main conductors developing a defect from some inherent cause, in the first place a leakage to the test conductor will come about and the potential of the test conductor will be raised. An early indication will be given on the four way switch being moved to position No. 2 and/or, if (in the case of a polyphase system) the neutral point or (in the case of a single phase system) the mid-voltage point or one terminal of the generator is earthed, to position No. 3. Upon the fault further developing, the transformers will be unbalanced as in the above mentioned case of external damage and the test conductor connected to earth in circuit with the devices, as above explained, by the solenoid switches being closed but the main circuit breaker trip coils will not be operated.

Indication of this stage will be given on the four-way switch being moved to position No. 3.

This obviously establishes a direct current circuit via the trip coil, the solenoid switch, the test conductor, the voltmeter or ammeter and earth, and also in the case of an earthed system, an alternating current circuit between the faulty main conductor and the neutral or mid-voltage point of the system via the leakage path between the main conductor and the test conductor, the ammeter or voltmeter and earth. The instruments have such resistance that the current flowing in the battery circuit thus formed is sufficient to operate the main circuit breaker trip coils, and such impedance as to prevent alternating currents of large or dangerous value flowing in the above mentioned alternating current circuit. In the next place, if and when the fault further develops, the insulation of the test conductor will break down. Thereupon the battery circuit will be established as before, and the main circuit breakers will be operated.

In the case of a number of feeders in parallel connecting bus bars, a leakage from one main conductor may cause all solenoid switches to be set but as soon as the faulty section is cut out, all the other solenoids will resume their normal positions.

In an arrangement as above described, we may connect the test conductor to earth at each end of the section through a plate gap arranged to break down when the potential of the test sheath is raised above a predetermined value, so that in case of a leakage from a main conductor raising the potential of the test conductor, when the potential of such conductor is raised to that predetermined value, the test conductor is earthed. By this means we avoid the risk of the detective appliances being injured when connected up owing to a too high potential in the test conductor, and also the risk of the test conductor insulation being broken down at some unknown part of the line at a distance from the defect which is causing the mischief.

Instead of installing the reactance between the batteries and their direct connections to earth, we may install them in the test conductor on the other side of the terminals, main circuit breaker trip coils, and batteries, and these reactances may be also used to constitute the primary windings of a transformer, the secondary windings being used to give any arranged signal. Further, if the system is earthed, this secondary winding may be used to energize a solenoid to operate a switch which completes a subsidiary circuit through the battery and the main circuit breaker trip coil so that if the test conductor, on its potential being raised above a predetermined value, is connected to earth either (a) by a broken down gap plate, or (b) through the switch (operated by the balance transformers) the main circuit breaker trip coil and the battery, the solenoid will close such subsidiary circuit and the main circuit breaker trip coils will be energized. This arrangement permits an alternating leakage to trip the main circuit breaker.

In the case of long lines, we may take means to obviate effects due to large capacity currents, for instance, when switching in cables and other apparatus, by temporarily interposing resistances or short circuiting parts of the apparatus in well-known manner.

By means of this arrangement, an experienced engineer in charge of the system by making frequent tests with the four way switch can get early indication of a fault and obtain knowledge of the extent of the fault and will be able to use his discretion as to shutting off at once or waiting for a convenient time to make repairs, and at the same time the system is automatically protected as soon as any dangerous defect develops.

What we claim as our invention and desire to secure by Letters Patent of the United States is:—

1. In an alternating electric distributive system detective and protective apparatus consisting of the combination of (a) a cable provided with an auxiliary normally insulated conductor surrounding the main insulated conductors or conductor and concentric with the outer covering (b) balancing transformers with the primary windings in connection with the main conductors and secondary winding in connection with a solenoid which when energized will operate a switch to connect the auxiliary conductor to earth through a battery the main circuit breaker trip coil and a reactance coil and (c) apparatus whereby the said auxiliary conductor can be readily connected alternatively to earth through a voltmeter or an ammeter, or to earth through a battery and shunted galvanometer, and / or to an electrostatic voltmeter.

2. In apparatus as claimed in claim 1 connecting the said auxiliary conductor to earth through a gap plate or some equivalent instrument substantially as and for the purposes described.

3. In apparatus as claimed in claim 1 or 2 the arrangement whereby the auxiliary conductor is in connection with the primary winding of a transformer (which may constitute the reactance described) and the secondary winding is in connection with a solenoid which when energized completes a subsidiary circuit in which are the battery and the main circuit breaker trip coils substantially as and for the purposes described.

In witness whereof we have signed this specification in the presence of two witnesses.

CHARLES JAMES BEAVER.
ARTHUR FRANCIS WARD RICHARDS.
ERNEST ALEXANDER CLAREMONT.

Witnesses:
C. A. NEALE,
E. B. JOULE.